United States Patent [19]
DeVolpi

[11] Patent Number: 6,107,993
[45] Date of Patent: Aug. 22, 2000

[54] KEYSTICK MINIATURE POINTING DEVICE

[76] Inventor: Dean R. DeVolpi, 629 Lariat Unit B, Incline Villiage, Nev. 89450

[21] Appl. No.: 09/088,184

[22] Filed: Jun. 1, 1998

Related U.S. Application Data

[60] Provisional application No. 60/061,825, Oct. 14, 1997.
[51] Int. Cl.[7] .................................................. G09G 5/08
[52] U.S. Cl. ............................................ 345/161; 159/168
[58] Field of Search ..................................... 345/161, 159, 345/160, 156, 157, 168, 174; 74/471 XY; 463/38; 341/22, 34

[56] References Cited

U.S. PATENT DOCUMENTS 5,087,904   2/1992   DeVolpi .
5,317,301   5/1994   DeVolpi .

*Primary Examiner*—Dennis-Doon Chow
*Attorney, Agent, or Firm*—Quinn & Quinn, P.C.; William J. Quinn; Cornelius P. Quinn

[57] ABSTRACT

A low-cost miniature joystick pointing device with improved performance, which may be mass produced from a small number of component parts, and which lends itself to production by automated machinery. An inner conductive contact is disposed inside of and surrounded by one or more outer contacts where deflection of the inner or outer contact results in a measurable resistance which may be interpreted by analog to digital or RC timing circuitry to produce speed and directional output.

16 Claims, 1 Drawing Sheet

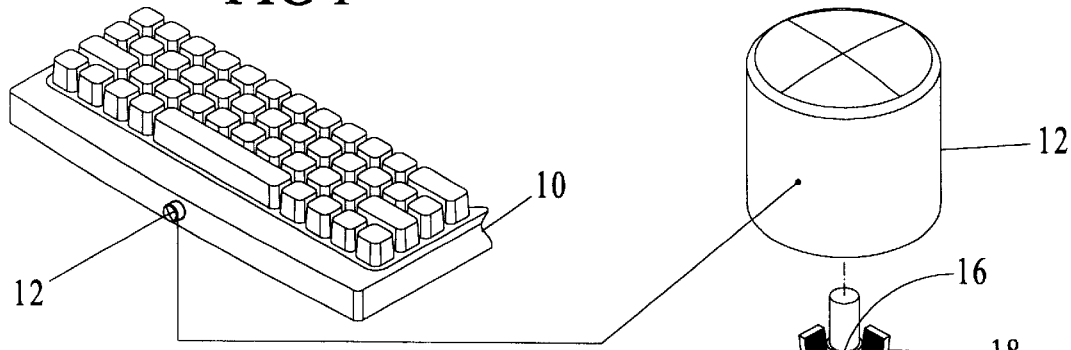
FIG 1
FIG 2
FIG 3
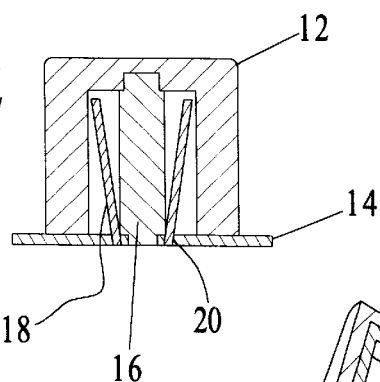
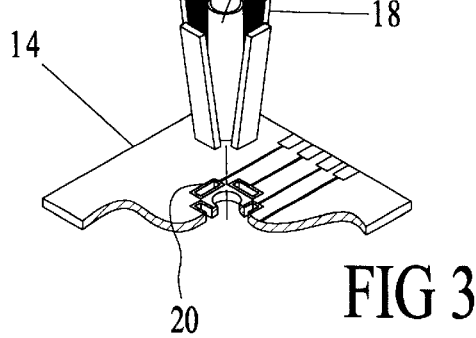
FIG 4
FIG 5
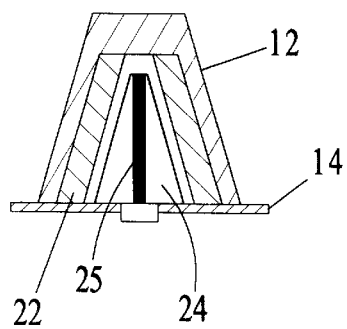
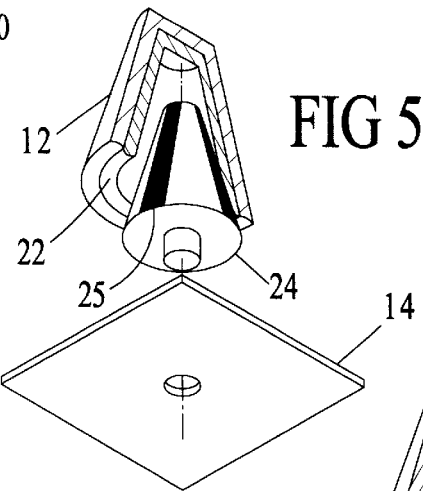
FIG 6
FIG 7
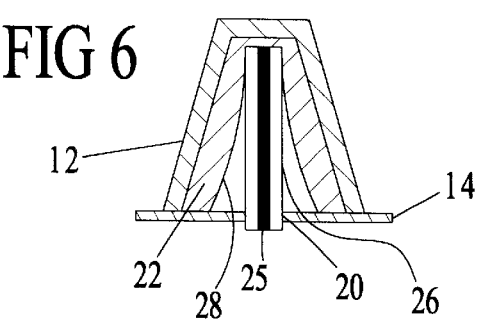
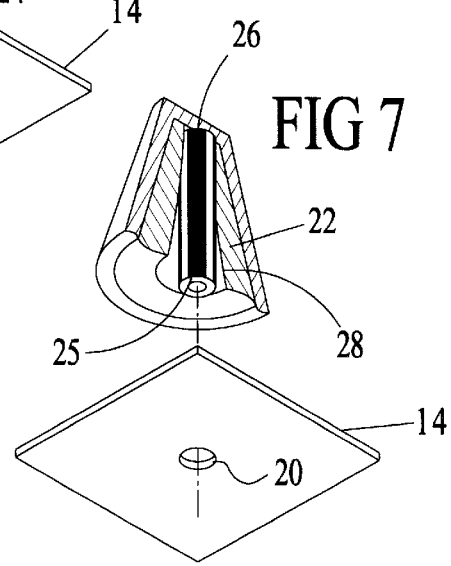

KEYSTICK MINIATURE POINTING DEVICE

CROSS REFERENCE TO RELATED APPLICATION

This application claims the benefit of U.S. provisional patent application Ser. No. 60/061825 filed Oct. 14, 1997 and entitled Resistive Pointing Technology, which is incorporated herein by reference.

FIELD OF THE INVENTION

The present invention relates generally to miniature joystick pointing devices, and, more specifically, to an improved low cost pointing device which may be utilized where space for such a pointing device is limited.

BACKGROUND OF THE INVENTION

It is often advantageous to incorporate joystick pointing control into computer keyboards, video game controls, hand held remote controls and similar devices. Various computer keyboards, video game controls, hand held remote controls and similar devices are known to incorporate joystick pointing control. In such applications the design of the joystick pointing control utilized has been dictated by several considerations, including, the overall size of the design, the number and cost of component parts, and the ease or difficulty encountered in mass production and associated cost of production. As a result, prior joystick pointing controls incorporated into such devices required an inordinate amount of force to operate, were limited in speed and direction variability, required an extensive amount of space or otherwise exceed the pricing point of similar devices incorporating joystick pointing control.

Accordingly, it is the object of the present invention to provide an improved joystick pointing device, that occupies very little space, requires less force in operation thereby obtaining increased user controllability, has greatly increased speed and direction variability with quicker more accurate response, and can be assembled and mass produced from a small number of component parts, with a consistent quality and uniformity at a low price.

SUMMARY OF THE INVENTION

The objects of the present invention are attained by a miniature joystick pointing device which uses resistive and conductive elements made of various materials, a board such as a printed circuit board, glass, paper, ceramic or plastic which has conductive lines and resistive coatings formed on it or embedded within it, homogeneous throughout or likewise provided on the surface.

In one embodiment of the miniature joystick pointing device, conductive rubber in the shape of a cylinder protrudes out of the center of a printed circuit board, which when deflected, in operation, makes contact with one or more resistive contacts which are attached to the printed circuit board and stick up from the printed circuit board and closely surround the conductive rubber cylinder. As the force deflecting the conductive rubber cylinder is increased, the measurable resistance changes accordingly.

In another embodiment of the miniature joystick pointing device, there is a central cylinder or cone attached to or passing through a printed circuit board and having resistive tracks on its outer surface. Conductive rubber which is in contact with the printed circuit board closely surrounds but does not contact the resistive tracts of the central cylinder or cone. When force is applied to the conductive rubber, thereby deforming its shape, contact is made between the conductive rubber and one or more resistive tracks. As the force deforming the conductive rubber is increase, the measurable resistance changes accordingly.

These embodiment of the miniature joystick pointing device where the conductive and resistive elements are placed in close proximity, with one surrounding the other, enables the invention to be manufactured in small size and therefore occupy very little space. Also, as the conductive rubber is deformed or deflected in operation of the invention, potential energy is stored in the deformed conductive rubber, therefore no return mechanism is required to return the miniature joystick pointing device to its centered position, as would be required of other joystick pointing devices, and, the force required of the operator in operation of the device is also reduced. Additionally, these embodiment of the miniature joystick pointing device are assembled from a minimal number of component parts, which simplifies mass production of a consistent product and lends itself to production by automated machinery. Further, as the measurable resistance that may be obtained from the present invention is continuous rather than incremental, and as the amount of force utilized in deforming or deflecting the conductive rubber toward one or more of the resistive contacts is proportional to the measurable resistance obtained, the degree of variability in speed and direction is therefore limited only by the analog to digital or RC timing circuitry utilized to interpret the measurable resistance.

Other objects, advantages and novel features of the present invention will become apparent from the following drawings and detailed description of the preferred embodiments.

BRIEF DESCRIPTION OF THE DRAWINGS

FIG. 1 is a perspective view of the present invention incorporated within a computer keyboard.

FIG. 2 is a sectional view illustrating a first embodiment of the present invention having a homogeneous center contact.

FIG. 3 is an exploded view of the first embodiment of the present invention shown in FIG. 2.

FIG. 4 is a sectional view illustrating a second embodiment of the present invention, having a cone shaped inner contact surrounded by an outer contact.

FIG. 5 is a sectional exploded view of the second embodiment of the present invention shown in FIG. 4.

FIG. 6 is a sectional view illustrating a third embodiment of the present invention, having a cylindrical shaped center contact surrounded by an outer contact.

FIG. 7 is a sectional exploded view of the third embodiment of the present invention shown in FIG. 6.

DETAILED DESCRIPTION OF THE PREFERRED EMBODIMENTS

FIG. 1 is a perspective view of a computer keyboard 10 which incorporates the present invention wherein the keystick cover 12 can be seen protruding from the front of computer keyboard 10.

A first embodiment of the present invention will now be described with reference to FIGS. 2 and 3.

The device shown in FIGS. 2 and 3 comprises a keystick cover 12, a bottom substrate 14, an elastic center contact 16, and outer contacts 18. The keystick cover 12 is preferably composed of a non-conductive material so that external current, including ESD, does not interfere with operation of the device. The keystick cover 12 is connected to the uppermost end of elastic center contact 16. Elastic center contact 16 is composed of an elastic material that may be deformed when an external force is applied. A central axis of elastic center contact 16 is defined by a line connecting the uppermost end of elastic center contact 16 and the lowermost end of elastic center contact 16. Bottom substrate 14, is placed toward the lowermost end of elastic center contact 16 with its surface plane perpendicular to the central axis of elastic center contact 16. Bottom substrate 14 has electrically conductive or resistive lines or coatings formed on its surface or embedded within it and has contact points 20 arranged around the central axis of elastic center contact 16 where the central axis of elastic center contact 16 intersects the surface plane of bottom substrate 14. Outer contacts 18 are affixed to bottom substrate 14 at contact points 20 such that outer contacts 18 surround elastic inner contact 16. Outer contacts 18 may be composed of either rigid or elastic material Elastic center contact 16 and outer contacts 18 are fashioned from either a homogeneous electrically conductive or resistive material or have surfaces which are electrically conductive or resistive; However, the surface of either elastic inner contact 16 or the surface of outer contacts 18 must have a measurably resistive surface.

In operation of the device shown in FIGS. 2 and 3, when an external force is applied to keystick cover 12 in any direction perpendicular to or tangential to the central axis of the center contact 16, the force is transmitted to the center contact 16 thereby deforming the shape of the center contact 16 in a bending fashion resulting in center contact 16 making physical and electrical contact with at least one outer contact 18. As greater force is applied to keystick cover 12, and therefore transmitted to central contact 16, a greater amount of the surface of center contact 16 and one or more outer contacts 18 will be in physical and electrical contact thereby changing the resistance proportionately. The resistance of any contact between the center contact 16 and any one or more outer contacts 18 may be measured by any available analog to digital or RC timing circuit and translated into speed and direction vectors. When an external force is applied to the keystick cover 12 and transmitted to elastic center contact 16 thereby deforming the shape of elastic center contact 16, potential energy is stored in center contact 16. Upon removal of the external force from keystick cover 12, the potential energy stored in elastic center contact 16 causes the elastic center contact 16 to return to its undeflected center position where no contact is made between elastic center contact 16 and any outer contact 18, and hence no speed or direction signal are present.

A second embodiment of the present invention will now be described with reference to FIGS. 4 and 5. In FIGS. 4 and 5, the same reference numbers as those utilized in FIGS. 2 and 3 are assigned to elements having the same names as those in FIGS. 2 and 3.

The device shown in FIGS. 4 and 5 comprises a keystick cover 12, a bottom substrate 14, an inner contact 24, and elastic outer contact 22. The keystick cover 12 is preferably composed of a non-conductive material so that external current, including ESD, does not interfere with operation of the device. The keystick cover 12 is fitted to and encloses elastic outer contact 22. The inner surface of elastic outer contact 22 typically corresponds to a portion of the outer shape of a cone, but may also correspond to regions of other shapes such as a pyramidal shape, bullet shape or tapered funnel shape. The outer surface of inner contact 24 is typically conical in shape, but may be formed in other shapes such as a pyramid, a bullet, or a tapered funnel, Inner contact 24 is attached on its lower end to bottom substrate 14 and typically has two or more separate contact tracts 25 established upon its surface and extending from its upper end to its lower end. Bottom substrate 14 has electrically conductive or resistive lines or coatings formed on its surface or embedded within it and electrical contact is made between said electrically conductive or resistive lines or coatings and the contact tracts 25 of inner contact 24. Elastic outer contact 22 is fashioned from either a homogeneous electrically conductive or resistive material or has an inner surface which is electrically conductive or resistive, and the contact tracts 25 of inner contact 24 are electrically conductive or resistive; However, the surface of either the inner surface of elastic outer contact 22 or the contact tracks 25 must have a measurably resistive surface. Elastic outer contact 22 is positioned to surround and enclose inner contact 24 such that no physical or electrical contact is made between the inner surface of outer contact 22 and the contact tracts 25 of inner contact 24 in the absence of external force.

In operation of the device shown in FIGS. 4 and 5, when an external force is applied to keystick cover 12 in any direction parallel to or tangential to surface plane of bottom substrate 14, the force is transmitted to the elastic outer contact 22 whereby the inner surface of elastic outer contact 22 makes physical and electrical contact with at least one of the contact tracts 25 of inner contact 24. As greater force is applied to keystick cover 12, and therefore transmitted to elastic outer contact 22, the shape of the inner surface of elastic outer contact 22 is deformed such that a greater area of the inner surface of elastic outer contact 22 and area of one or more contact tracts 25 of inner contact 24 will be in physical and electrical contact thereby changing the resistance proportionately. The resistance of any contact between the inner surface of elastic outer contact 22 and any one or more contact tracts 25 may be measured by any available analog to digital or RC timing circuit and translated into speed and direction vectors.

A third embodiment of the present invention will now be described with reference to FIGS. 6 and 7. In FIGS. 6 and 7, the same reference numbers as those utilized in FIGS. 2 through 5 are assigned to elements having the same names as those in FIGS. 2 through 5. The device shown in FIGS. 6 and 7 comprises a keystick cover 12, a bottom substrate 14, a cylindrical shaped inner contact 26, and elastic outer contact 22. The inner surface of elastic outer contact 22 typically corresponds to a portion of the outer shape of a tapered funnel, wherein such shape may be defined by a curved line that moves along a closed curved while always passing through a fixed point. Alternately, the inner surface of elastic outer contact 22 may correspond to other shapes such as a portion of the outer surface of a pyramid, cone or bullet. The keystick cover 12 is preferably composed of a non-conductive material so that external current, including ESD, does not interfere with operation of the device. The keystick cover 12 is fitted to and encloses elastic outer contact 22. Cylindrical shaped inner contact 26 is fitted at its lower end within an aperture in bottom substrate 14 and preferably has two or more separate contact tracts 25 established upon its surface and extending from its upper end to its lower end. Bottom substrate 14 has electrically conductive or resistive lines or coatings formed on its surface or embedded within it and electrical contact is made between said electrically conductive or resistive lines or coatings and contact tracts 25 of cylindrical shaped inner contact 26 at contact points 20 of said aperture of the bottom substrate 14. Elastic outer contact 22 is fashioned from either a homogeneous electrically conductive or resistive material or has surfaces which are electrically conductive or resistive, and the contact tracts 25 of cylindrical shaped inner contact 26 are electrically conductive or resistive; However, the surface of either the inner surface of elastic outer contact 22 or the contact tracks 25 must have a measurably resistive surface. Elastic outer contact 22 is positioned to surround and enclose cylindrical shaped inner contact 26.

In operation of the device shown in FIGS. 6. and 7, when an external force is applied to keystick cover 12 in any direction parallel to or tangential to surface plane of bottom substrate 14, the force is transmitted to the elastic outer contact 22 whereby the inner surface of elastic outer contact 22 makes physical and electrical contact with at least one of the contact tracts 25 of cylindrical shaped inner contact 26. As greater force is applied to keystick cover 12, and therefore transmitted to elastic outer contact 22, the shape of the inner surface of elastic outer contact 22 is deformed such that a greater area of the inner surface of elastic outer contact 22 and area of one or more contact tracts 25 of cylindrical shaped inner contact 26 will be in physical and electrical contact thereby changing the resistance proportionately. The resistance of any contact between the inner surface of elastic outer contact 22 and any one or more contact tracts 25 may be measured by any available analog to digital or RC timing circuit and translated into speed and direction vectors.

Although the detailed description of the drawings is directed toward illustrating the above described embodiments, the present invention is not limited to such embodiments, as variations and modifications may be made without departing from the scope of the present invention as claimed herein.

What is claimed is:

1. A multi-speed multi-direction analog miniature joystick pointing device comprising:
    an outer contact having a central void wherein the surface of said outer contact defining said central void is electrically resistive;
    a central contact that is disposed within the central void of said outer contact and surrounded by said surface of said outer contact defining said central void wherein the surface of said central contact is electrically conductive; and further wherein said central contact has an undeflected position, whereby no contact is established between said central contact and said outer contact, and further wherein said central contact is elastic and deflectable to establish electrical contact between said central contact and said outer contact at various positions thereby creating a measurable resistance and further wherein said measurable resistance is proportional to the extent of contact between said central contact and said outer contact as increasing force is applied in deflection of said central contact.

2. The multi-speed multi-direction analog miniature joystick pointing device according to claim 1 wherein said outer contact is elastic whereby said outer contact is deformed, when contact is made between said central contact and said outer contact, to an extent corresponding to the amount of force applied in deflecting said central contact and resulting in a corresponding variation in measurable resistance.

3. The multi-speed multi-direction analog miniature joystick pointing device according to claim 1 wherein said surface of said outer contact defining said central void and surrounding said central contact is divided into a plurality of discrete resistive regions such that when said central contact is deflected it establishes electrical contact with at least one of said discrete resistive regions.

4. The multi-speed multi-direction analog miniature joystick pointing device according to claim 1 wherein said outer contact defining said central void and surrounding said central contact is comprised of a plurality of discrete resistive pieces such that when said central contact is deflected it establishes electrical contact with at least one of said discrete resistive pieces.

5. The multi-speed multi-direction analog miniature joystick pointing device according to claim 1 wherein said surface of said central contact is electrically resistive.

6. A multi-speed multi-direction analog miniature joystick pointing device comprising:
    a central contact having an outer surface wherein the surface of said central contact is electrically resistive;
    an outer contact surrounding said central contact wherein the inner surface of said outer contact is electrically conductive; and further wherein said outer contact has an undeformed position, whereby no contact is established between said inner surface of said outer contact and said outer surface of said central contact, and further wherein said outer contact is elastic and deformable to establish electrical contact between said inner surface of said outer contact and said outer surface of said central contact at various positions thereby creating a measurable resistance and further wherein said measurable resistance is proportional to the extent of contact between said inner surface of said outer contact and said outer surface of said central contact as increasing force is applied in deforming said outer contact.

7. The multi-speed multi-direction analog miniature joystick pointing device according to claim 6 wherein said central contact is elastic whereby said central contact is deflected, when contact is made between said outer contact and said central contact, to an extent corresponding to the amount of force applied in deforming said outer contact and resulting in a corresponding variation in measurable resistance.

8. The multi-speed multi-direction analog miniature joystick pointing device according to claim 6 wherein the outer surface of said central contact is divided into a plurality of discrete resistive regions such that when said outer contact is deformed it establishes electrical contact with at least one of said discrete resistive regions.

9. The multi-speed multi-direction analog miniature joystick pointing device according to claim 6 wherein said inner surface of said outer contact is electrically resistive.

10. A multi-speed multi-direction analog miniature joystick pointing device comprising:
    an outer contact having a central void wherein the surface of said outer contact defining said central void is electrically conductive;
    a central contact that is disposed within the central void of said outer contact and surrounded by said surface of said outer contact defining said central void wherein the surface of said central contact is electrically resistive; and further wherein said central contact has an undeflected position, whereby no contact is established between said central contact and said outer contact, and further wherein said central contact is elastic and deflectable to establish electrical contact between said central contact and said outer contact at various positions thereby creating a measurable resistance and further wherein said measurable resistance is proportional to the extent of contact between said central contact and said outer contact as increasing force is applied in deflection of said central contact.

11. The multi-speed multi-direction analog miniature joystick pointing device according to claim 10 wherein said outer contact is elastic whereby said outer contact is deformed, when contact is made between said central contact and said outer contact, to an extent corresponding to the amount of force applied in deflecting said central contact and resulting in a corresponding variation in measurable resistance.

12. The multi-speed multi-direction analog miniature joystick pointing device according to claim 10 wherein the surface of said outer contact defining said central void and surrounding said central contact is divided into a plurality of discrete conductive regions such that when said central contact is deflected it establishes electrical contact with at least one of said discrete conductive regions.

13. The multi-speed multi-direction analog miniature joystick pointing device according to claim 10 wherein said outer contact defining said central void and surrounding said central contact is comprised of a plurality of discrete conductive pieces such that when said central contact is deflected it establishes electrical contact with at least one of said conductive pieces.

14. A multi-speed multi-direction analog miniature joystick pointing device comprising:

a central contact having an outer surface wherein the surface of said central contact is electrically conductive;

an outer contact surrounding said central contact wherein the inner surface of said outer contact is electrically resistive; and further wherein said outer contact has an undeformed position, whereby no contact is established between said inner surface of said outer contact and said outer surface of said central contact, and further wherein said outer contact is elastic and deformable to establish electrical contact between said inner surface of said outer contact and said outer surface of said central contact at various positions thereby creating a measurable resistance and further wherein said measurable resistance is proportional to the extent of contact between said inner surface of said outer contact and said outer surface of said central contact as increasing force is applied in deforming said outer contact.

15. The multi-speed multi-direction analog miniature joystick pointing device according to claim 14 wherein said central contact is elastic whereby said central contact is deflected, when contact is made between said outer contact and said central contact, to an extent corresponding to the amount of force applied in deforming said outer contact and resulting in a corresponding variation in measurable resistance.

16. The multi-speed multi-direction analog miniature joystick pointing device according to claim 14 wherein the outer surface of said central contact is divided into a plurality of discrete conductive regions such that when said outer contact is deformed it establishes electrical contact with at least one of said discrete resistive regions.

* * * * *

UNITED STATES PATENT AND TRADEMARK OFFICE
CERTIFICATE OF CORRECTION

PATENT NO. : 6,107,993
DATED : August 22, 2000
INVENTOR(S) : DeVolpi

It is certified that error appears in the above-identified patent and that said Letters Patent is hereby corrected as shown below:

Title page,
Item [22], "Filed: Jun. 1, 1998" should be -- Filed: May 31, 1998 --

Signed and Sealed this

Thirtieth Day of April, 2002

*Attest:*

*Attesting Officer*

JAMES E. ROGAN
*Director of the United States Patent and Trademark Office*